(12) United States Patent
Soma et al.

(10) Patent No.: US 11,890,919 B2
(45) Date of Patent: Feb. 6, 2024

(54) DOOR BEAM STRUCTURE FOR VEHICLE SIDE DOOR AND MANUFACTURING METHOD THEREOF

(71) Applicants: HONDA MOTOR CO., LTD., Tokyo (JP); Sumitomo Heavy Industries, Ltd., Tokyo (JP)

(72) Inventors: Takayuki Soma, Saitama (JP); Eiji Hirano, Saitama (JP); Yu Iemura, Saitama (JP); Hiroyuki Kumeno, Ehime (JP); Kozaburo Sakamaki, Ehime (JP); Masanori Fukuda, Saitama (JP)

(73) Assignees: HONDA MOTOR CO., LTD., Tokyo (JP); SUMITOMO HEAVY INDUSTRIES, LTD., Tokyo (JP)

( * ) Notice: Subject to any disclaimer, the term of this patent is extended or adjusted under 35 U.S.C. 154(b) by 61 days.

(21) Appl. No.: 17/705,926

(22) Filed: Mar. 28, 2022

(65) Prior Publication Data
US 2022/0314757 A1 Oct. 6, 2022

(30) Foreign Application Priority Data
Mar. 30, 2021 (JP) .................................. 2021-056556

(51) Int. Cl.
*B60J 5/04* (2006.01)

(52) U.S. Cl.
CPC ........... *B60J 5/0447* (2013.01); *B60J 5/0423* (2013.01)

(58) Field of Classification Search
CPC ...... B60J 5/0447; B60J 5/0423; B60J 5/0444; B60J 5/0443; B60J 5/0413; B60J 5/0427; B60J 5/0431

USPC ......... 296/146.6, 187.12, 209; 293/120, 121, 293/122
See application file for complete search history.

(56) References Cited

U.S. PATENT DOCUMENTS

| | | | | |
|---|---|---|---|---|
| 5,232,261 A * | 8/1993 | Kuroda | .................. | B60J 5/0444 296/146.4 |
| 5,404,690 A * | 4/1995 | Hanf | ...................... | B60J 5/0437 296/187.12 |
| 5,553,910 A * | 9/1996 | Park | ....................... | B60J 5/0447 49/502 |
| 5,580,120 A * | 12/1996 | Nees | ....................... | B60J 5/0444 296/187.12 |
| 8,727,421 B2 * | 5/2014 | Cohoon | ................ | B60J 5/0425 296/146.6 |
| 2008/0246308 A1 * | 10/2008 | Uchida | ..................... | C21D 9/08 296/187.03 |
| 2016/0159207 A1 * | 6/2016 | Ogawa | .................... | B60J 5/0463 49/504 |
| 2017/0028825 A1 * | 2/2017 | Eckart | .................... | B60J 5/0429 |

FOREIGN PATENT DOCUMENTS

JP 2010-149841 7/2010

* cited by examiner

*Primary Examiner* — Amy R Weisberg
*Assistant Examiner* — Veronica M Shull
(74) *Attorney, Agent, or Firm* — Rankin, Hill & Clark LLP

(57) ABSTRACT

A door beam structure for a vehicle side door includes a door beam having a hollow cross section, wherein the door beam includes: an outside portion forming a hollow flange of the door beam arranged to face a door skin, and an inside portion forming a hollow door beam body of the door beam.

9 Claims, 13 Drawing Sheets

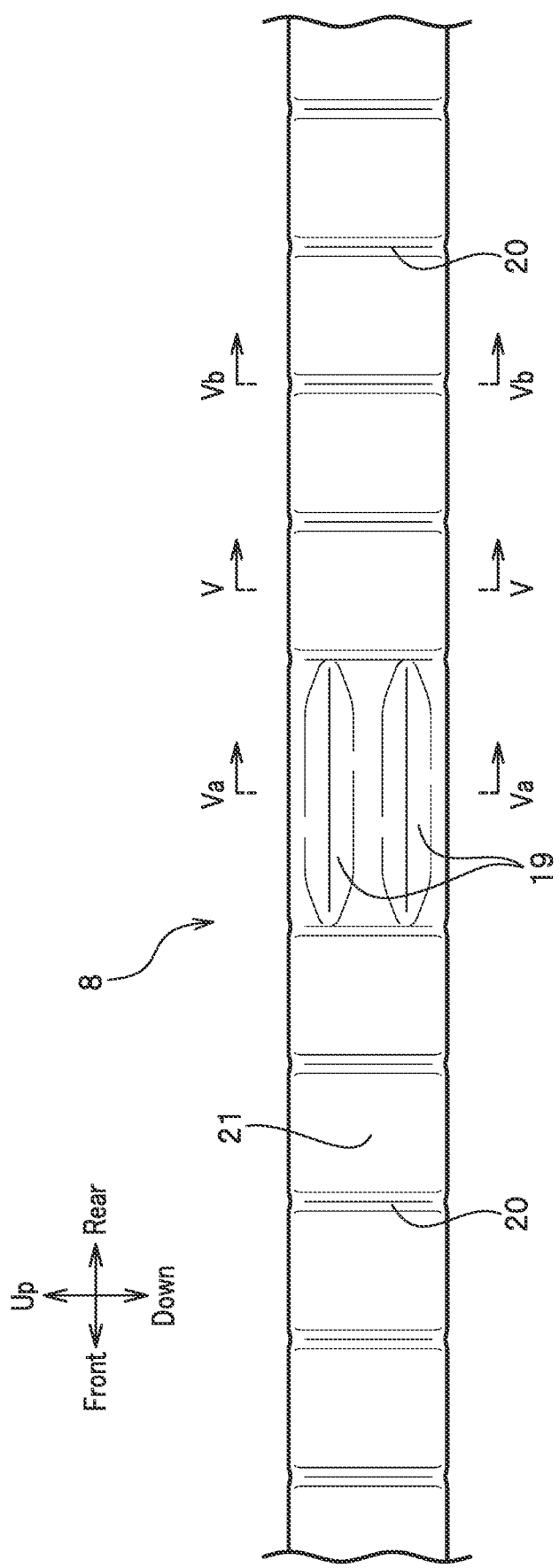

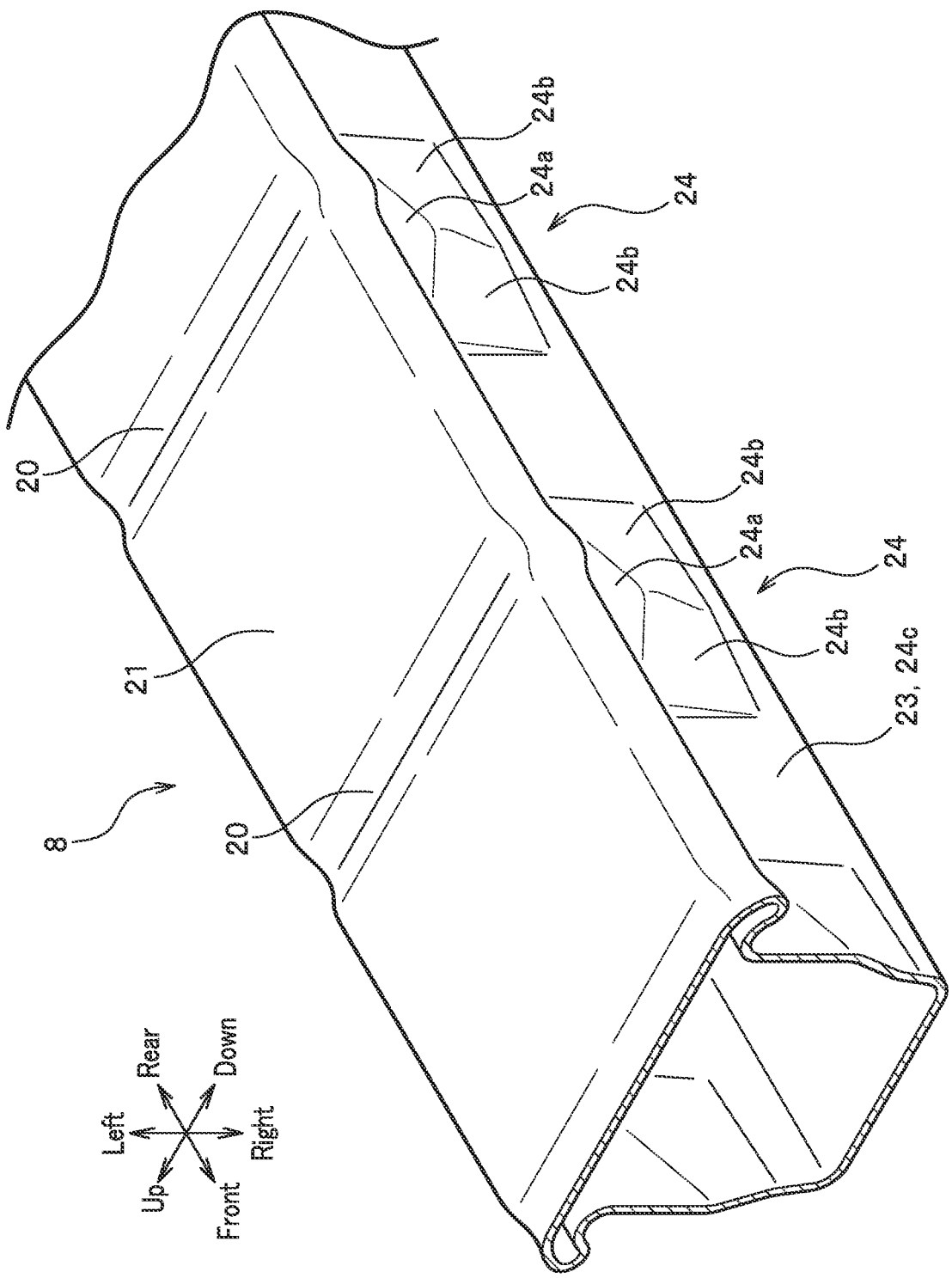

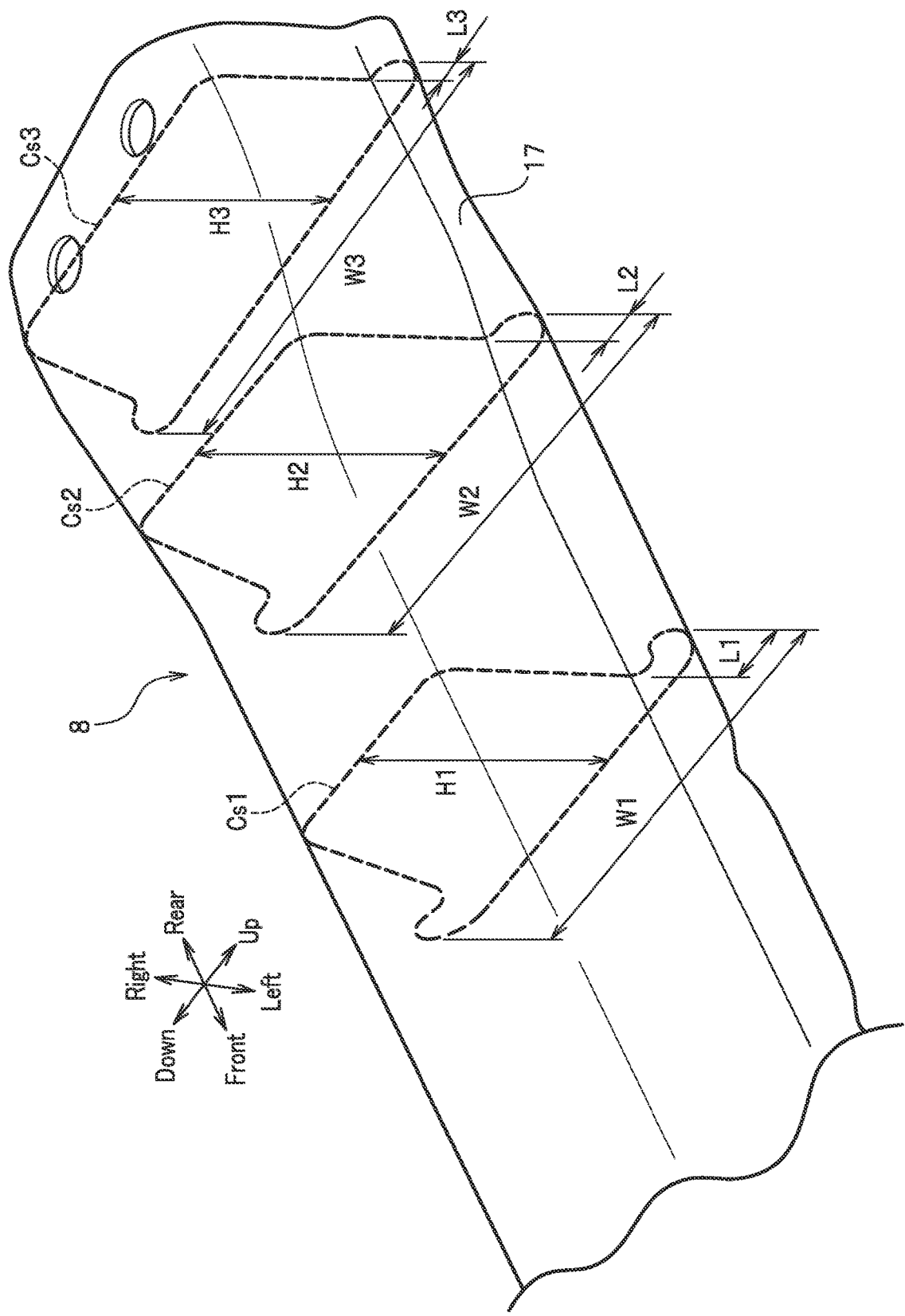

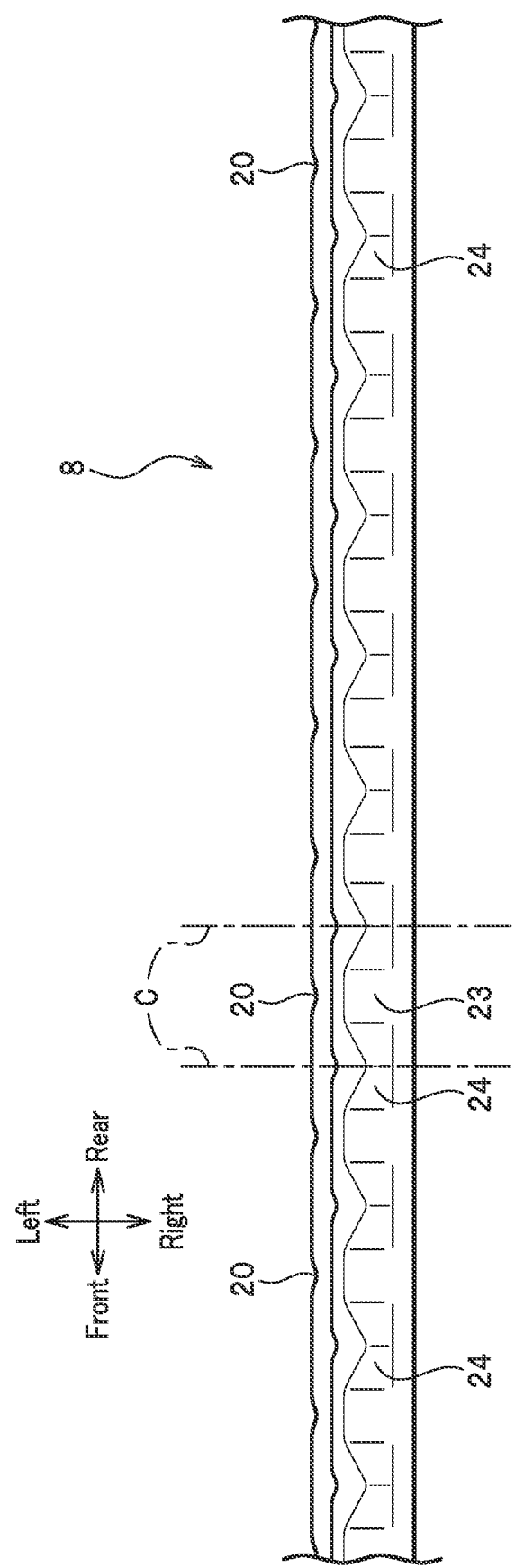

DOOR BEAM STRUCTURE FOR VEHICLE SIDE DOOR AND MANUFACTURING METHOD THEREOF

CROSS-REFERENCE TO RELATED APPLICATION

This application claims the benefit of priority to Japanese Patent Application No. 2021-056556 filed on Mar. 30, 2021, the disclosures of all of which are hereby incorporated by reference in their entireties.

TECHNICAL FIELD

The present invention relates to a door beam structure for a vehicle side door and a manufacturing method thereof.

BACKGROUND OF THE INVENTION

A conventional door beam structure for a side door of a vehicle has been known to have a door beam extending along an inside surface of a door skin (see Japanese Application Publication No. 2010-149841 A (hereinafter, referred to as Patent Document 1), for example). This door beam is a tubular member made of a roll-formed steel plate and has two (upper and lower) closed cross sections in a cross-sectional view intersecting a longitudinal direction. In particular, the cross section of the door beam consists of two right-angled trapezoidal shapes, which are vertically symmetrical, to form a substantially isosceles trapezoid as a whole. The door beam is arranged so that an upper base (short side) of upper and lower bases of the isosceles trapezoid faces the door skin. This causes two legs of the isosceles trapezoid to be inclined so as to come closer to each other toward the door skin. According to such a door beam structure, inclined portions of the door beam corresponding to the legs of the trapezoid prevents the door beam from being deformed, when a collision force is inputted to the door from outside of the vehicle, to improve a resistive force against a collision.

SUMMARY

However, a conventional door beam structure (see Patent Document 1, for example) has portions of the steel plate vertically lapping at a dividing wall, where the two (upper and lower) closed cross sections face each other, to have a problem that the door beam as a whole is increased in weight.

Then, the present invention is intended to provide a door beam structure for a vehicle side door, having a superior collision absorption capability in case of a collision and effecting reduction in weight of a door beam, and a manufacturing method thereof.

A door beam structure for a vehicle side door, for resolving the above-identified problem, includes: a door beam having a hollow cross section, wherein the door beam includes an outside portion forming a hollow flange of the door beam arranged to face a door skin, and an inside portion forming a hollow door beam body of the door beam. In addition, a manufacturing method of the door beam structure for a vehicle side door includes: swelling a steel pipe by supplying gas into the steel pipe heated in a die; and press molding the swelled steel pipe into the door beam, including the outside portion and the inside portion, in the die.

According to the present invention, a door beam structure for a vehicle side door, having a superior collision absorption capability in case of a collision and effecting reduction in weight of a door beam, and a manufacturing method thereof are provided.

BRIEF DESCRIPTION OF DRAWINGS

FIG. 4A is a plan view of the door beam, as viewed from a direction indicated by an open arrow IVa in FIG. 3;

FIG. 6 is a partially enlarged perspective view of protruding portions of the door beam;

FIG. 7 is a schematic diagram of the door beam to show a structure of a closed cross section being gradually varied;

FIG. 12 is a lateral view of a modification of the door beam, corresponding to FIG. 4B.

DETAILED DESCRIPTION

Figure 1:
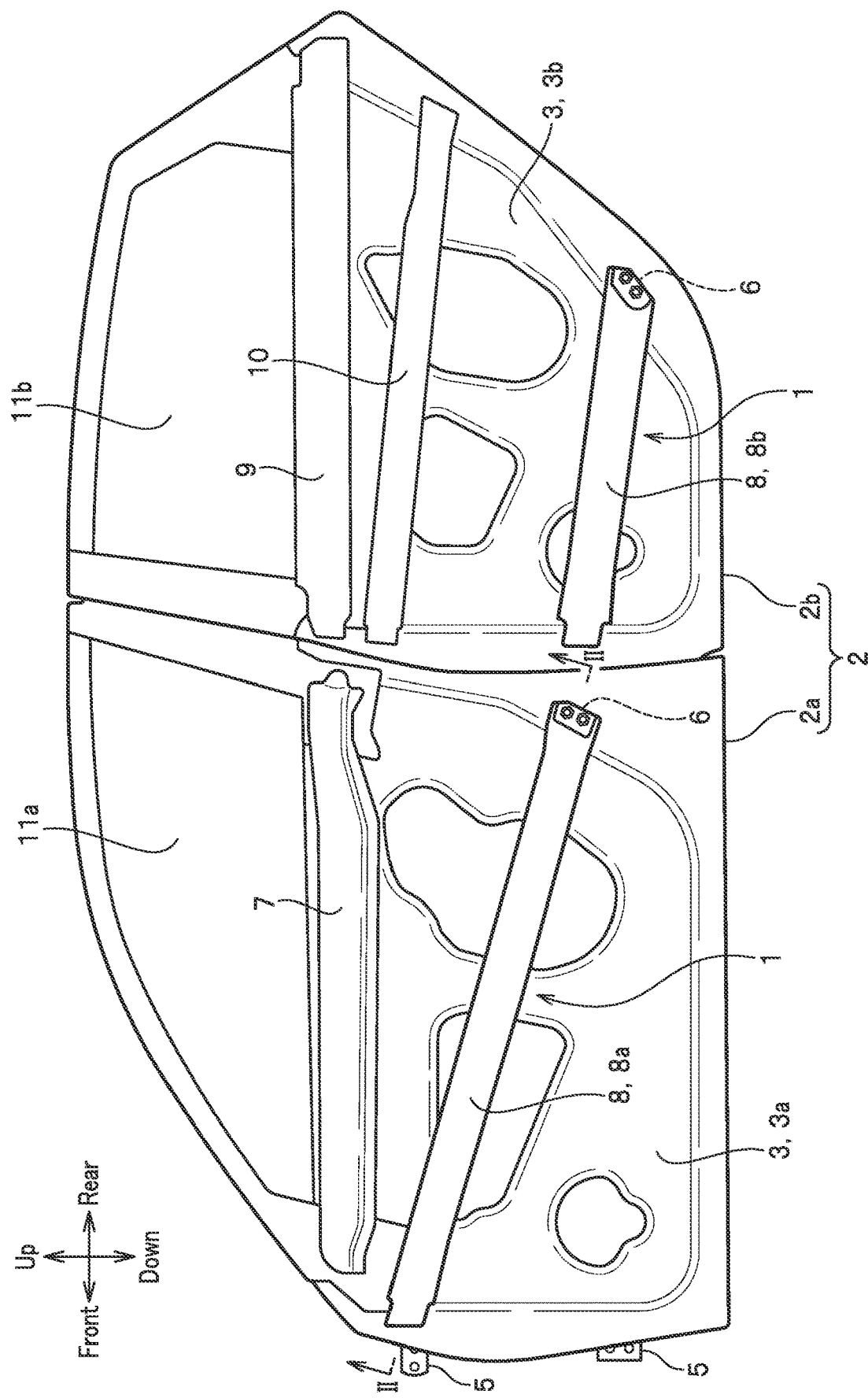
FIG. 1 is a lateral view of a vehicle door having a door beam structure according to an embodiment of the present invention.
Figure 2:
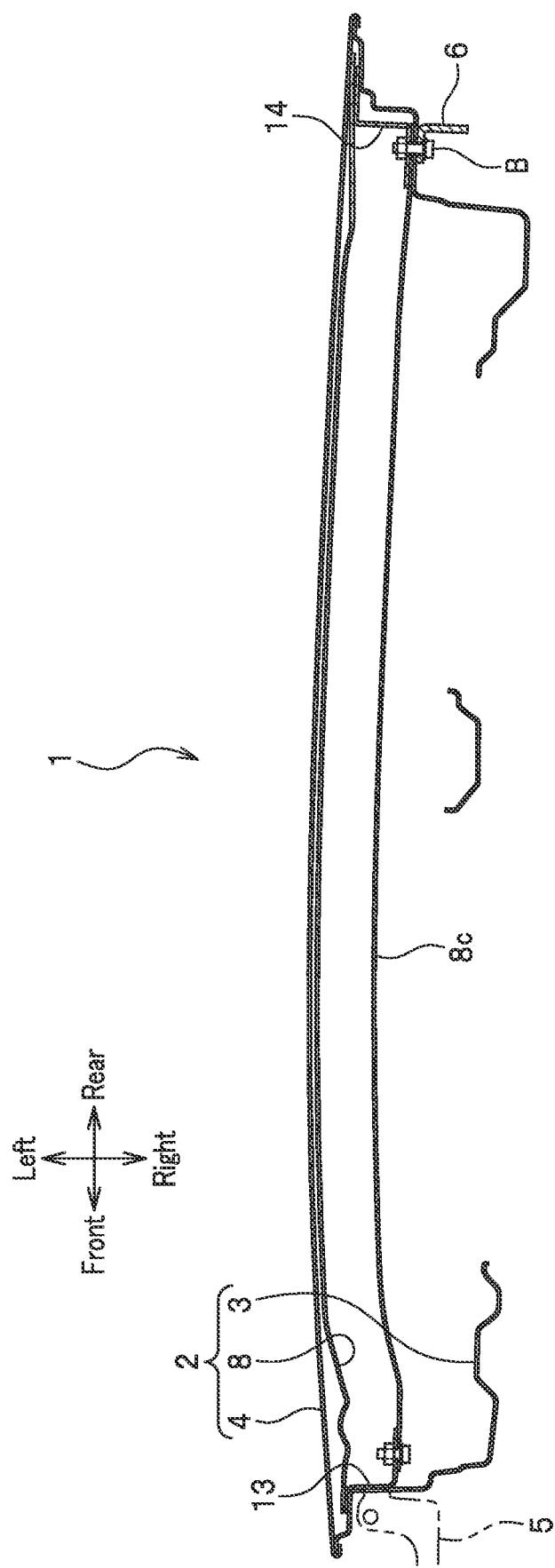
FIG. 2 is a cross-sectional view, taken along a line II-II in FIG. 1.

Next, a description is given in detail of a door beam structure according to an embodiment of the present invention. The door beam structure of the present embodiment includes a door beam having a hollow door beam body (inside portion) and a hollow flange (outside portion) arranged to face a door skin. The door beam of the present embodiment is formed of a pipe compression molded body, as will be described in detail below. FIG. 1 is a lateral view of a side door 2 on a left side of a vehicle having a door beam structure 1 according to the present embodiment. FIG. 2 is a cross-sectional view, taken along a line II-II in FIG. 1. Note that a front-rear, up-down, and right-left directions in the present embodiment correspond to those of a vehicle. In FIG. 1, a door skin 4 (see FIG. 2) is not shown for the purpose of illustration. Hereinbelow, only the door beam structure 1 applied to the side door 2 on the left side of the vehicle is described, and that on the right side of the vehicle, which is symmetrical to the former with respect to a central axis of a vehicle body, is not described.

<Side Door>

As shown in FIG. 1, the side door 2 having the door beam structure 1 includes a front side door 2a for opening/closing a front opening (not shown) on a lateral side of the vehicle, and a rear side door 2b for opening/closing a rear opening (not shown) on the lateral side of the vehicle.

The front side door 2a includes an inside panel 3a, and the door skin 4 (see FIG. 2) arranged on an outer side in a vehicle width direction of the inner panel 3a (near side in a plane of paper in FIG. 1). Incidentally, the door skin 4 of the present embodiment is assumed to be arranged at a predetermined distance from the inner panel 3a and joined to a peripheral edge of the inner panel 3a by hemming. The inner panel 3a includes a first reinforcing member 7 and a first door beam 8a. The first door beam 8a, along with a second door beam 8b of the rear side door 2b to be described next, corresponds to a "door beam" in one or more claims as appended or as subsequently amended.

The first reinforcing member 7 is an elongated member arranged to extend in a front-rear direction at an upper portion of the inner panel 3a, which forms a lower rim of a window 11a. The first door beam 8a is arranged below the first reinforcing member 7 so as to extend in the front-rear direction between a front and rear edges of the inner panel 3a. In particular, the first door beam 8a is inclined so as to be displaced downward as it extends rearward. Incidentally, the first door beam 8a of the present embodiment extends so as to straddle an upper hinge 5 of a pair of upper and lower hinges 5 of the side door 2a, and an engaging hook 6 configured to engage with a vehicle body when the side door 2a is closed.

The rear side door 2b includes an inner panel 3b and a door skin (not shown) arranged on an outer side in the vehicle width direction of the inner panel 3b (near side on a paper of plane in FIG. 1) and joined to the inner panel 3b by hemming, as with the door skin 4 (see FIG. 2) of the side door 2a. The inner panel 3b includes a second reinforcing member 9, a third reinforcing member 10, and the second door beam 8b. The second reinforcing member 9 is an elongated member arranged to extend in the front-rear direction at an upper portion of the inner panel 3b, which forms a lower rim of a window 11b. The third reinforcing member 10 is arranged below the second reinforcing member 9 so as to extend in the front-rear direction between a front and rear edges of the inner panel 3b. In particular, the third reinforcing member 10 is inclined so as to be displaced downward as it extends rearward. Incidentally, the third reinforcing member 10 of the present embodiment extends so as be substantially parallel to the second door beam 8b.

The second door beam 8b (door beam) is arranged below the third reinforcing member 10 and is inclined so as to be displaced downward as it extends rearward. Note that the second door beam 8b of the present embodiment extends so as to straddle a lower hinge of a pair of upper and lower hinges (not shown) of the side door 2b, and the engaging hook 6 configured to engage with the vehicle body when the side door 2b is closed. The first door beam 8a and second door beam 8b of the present embodiment are arranged to extend along a line connecting an upper front end of the inner panel 3a with a lower rear end of the inner panel 3b, in a lateral view of the vehicle in FIG. 1. Note that hereinbelow the side doors 2a and 2b, the inner panels 3a and 3b, and the first and second door beams 8a and 8b may simply be referred to as the side door 2, the inner panel 3, and the door beam 8, when one is not particularly distinguished from the other.

<Door Beam Structure>

Next, the door beam structure 1 (see FIG. 1) of the present embodiment is described in detail, using the first door beam 8a (see FIG. 1) of the front side door 2a (see FIG. 1) as an example. As shown in FIG. 2 of a cross-sectional view, taken along a line II-II in FIG. 1, the door beam structure 1 of the present embodiment includes the door beam 8 arranged between the door skin 4 and inner panel 3 of the side door 2. Note that the door hinge 5 is represented in a phantom line (chain double-dashed line) in FIG. 2, for the purpose of illustration.

The door beam 8 extends along an inner wall surface of the door skin 4 arranged on an outer side in the vehicle width direction (left side in FIG. 2) of the closed side door 2. In particular, the door beam 8 has a general portion 8c accounting for most in the longitudinal direction thereof curved so as to be slightly convex outward in the vehicle width direction to conform with a curvature of a curved surface of the door skin 4, which is convex outward. Note that a gap in FIG. 2 between the door skin 4 and the general portion 8c of the door beam 8 is exaggeratedly drawn, and the door skin 4 and the general portion 8c of the door beam 8 are in close contact with each other via a mastic sealer (not shown).

In addition, a front end of the door beam 8 of the present embodiment is joined to the inner panel 3 via a door hinge reinforcement member 13. Further, a rear end of the door beam 8 of the present embodiment is joined to the inner panel 3 via a reinforcing member 14 of the engaging hook 6 (engaging member).

Figure 3:
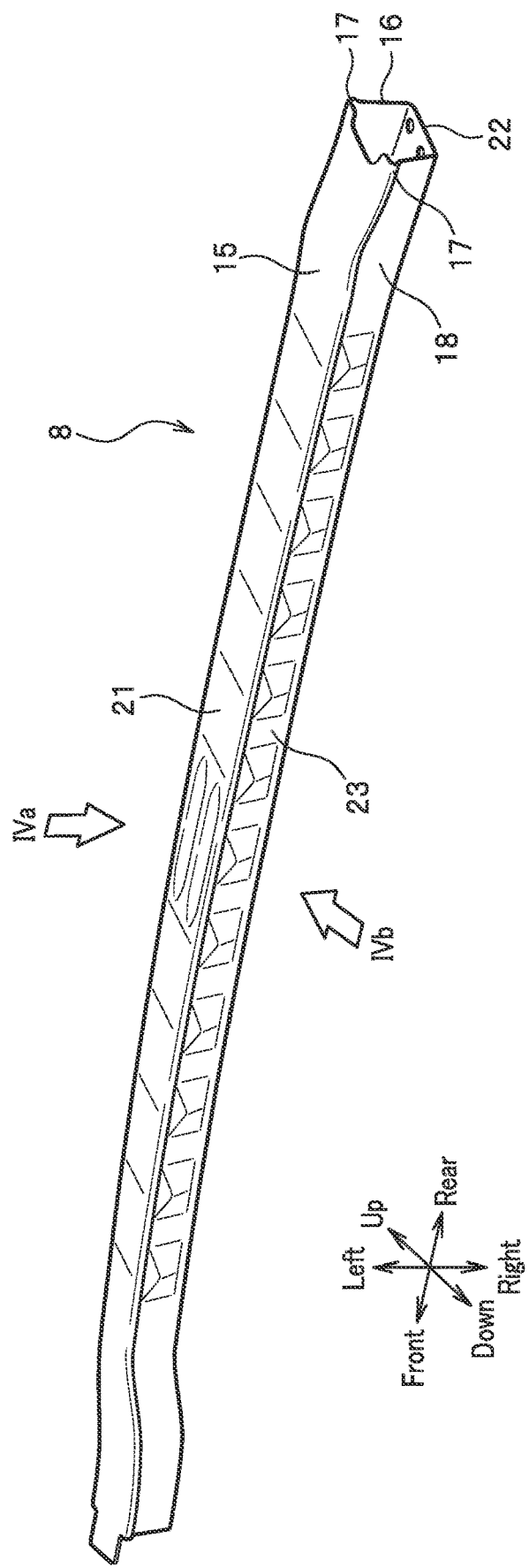
FIG. 3 is an overall perspective view of a door beam.
Figure 4B:
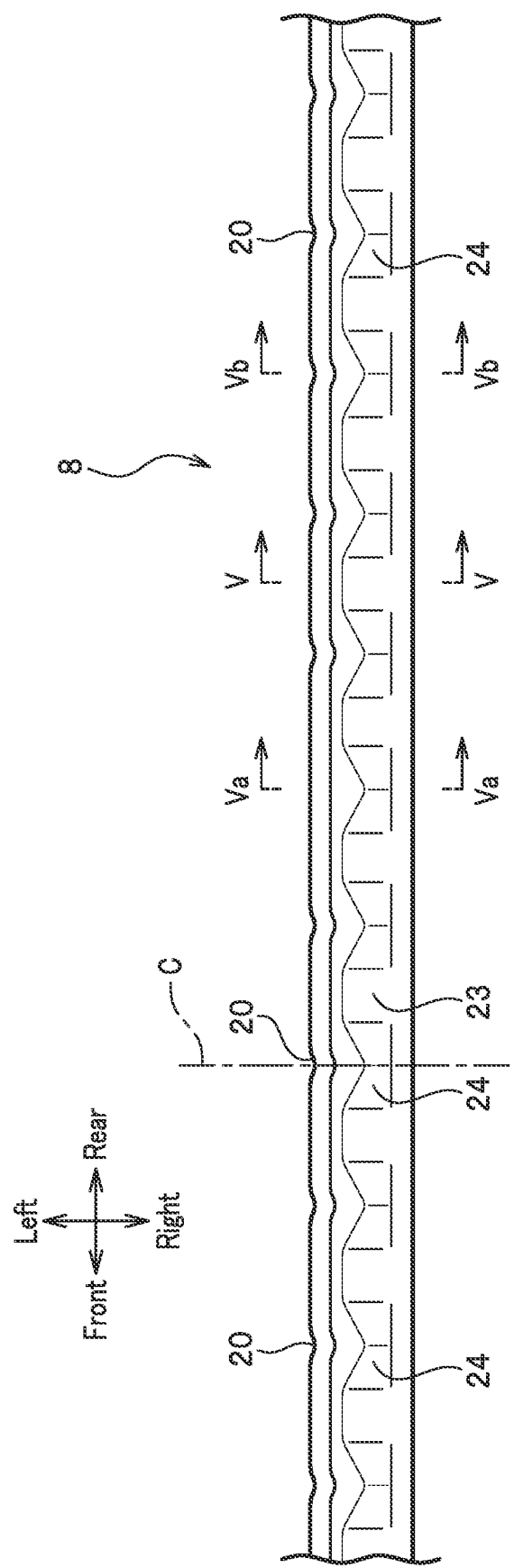
FIG. 4B is a lateral view of the door beam, as viewed from a direction indicated by an open arrow IVb in FIG. 3.
Figure 5A:
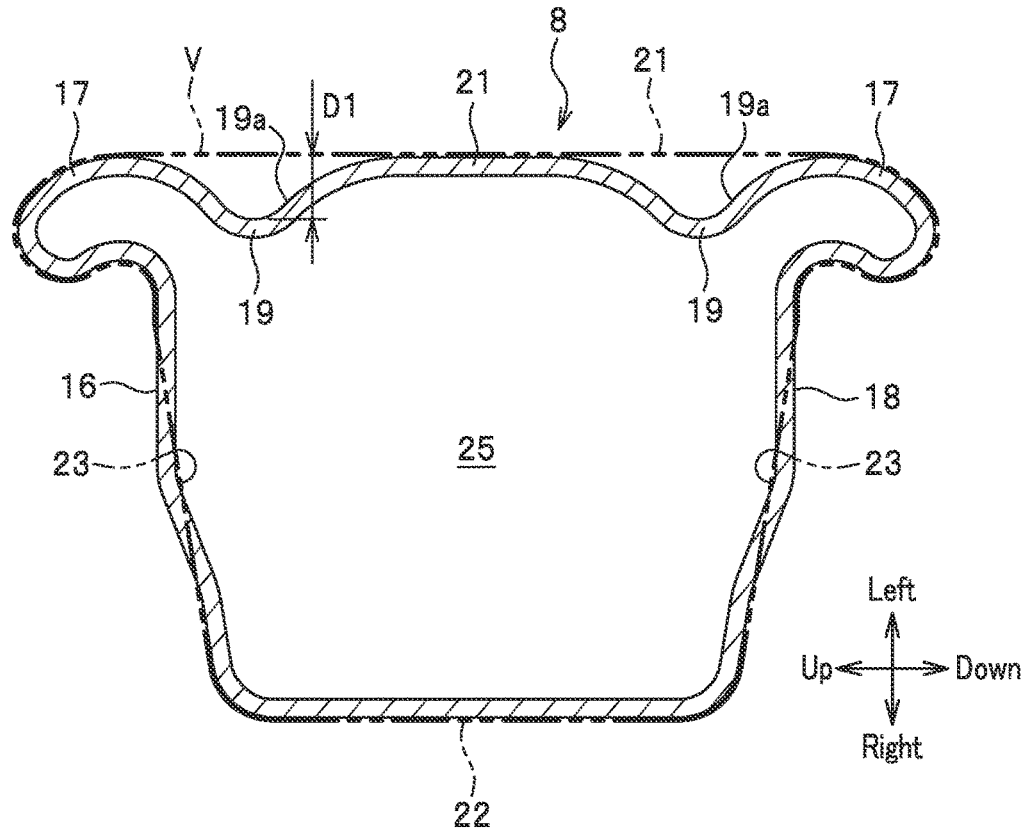
FIG. 5A is a cross-sectional view, taken along a line Va-Va in FIG. 4A or 4B.
Figure 5B:
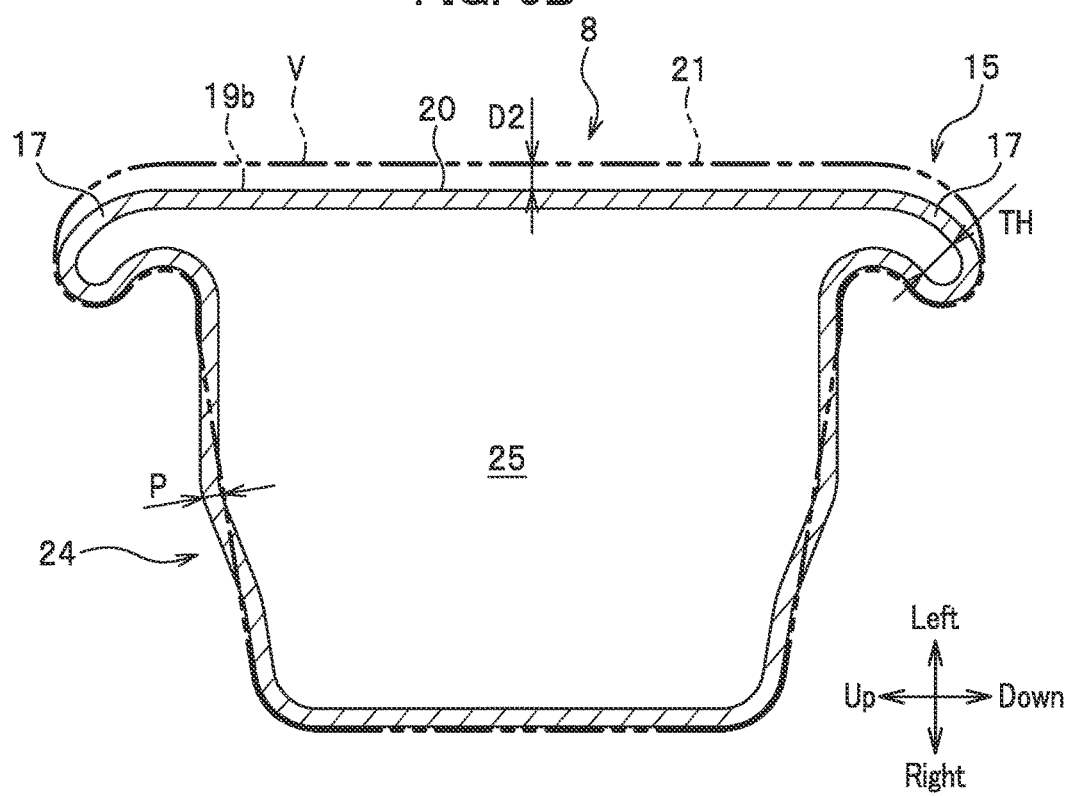
FIG. 5B is a cross-sectional view, taken along a line Vb-Vb in FIG. 4A or 4B.

Next, the door beam 8 (see FIG. 2) is described more in particular. FIG. 3 is an overall perspective view of the door beam 8. FIG. 4A is a plan view of the door beam 8, as viewed from a direction indicated by an open arrow IVa in FIG. 3. FIG. 4B is a lateral view of the door beam 8, as viewed from a direction indicated by an open arrow IVb in FIG. 3. FIG. 5A is a cross-sectional view, taken along a line Va-Va in FIG. 4A or 4B. FIG. 5B is a cross-sectional view, taken along a line Vb-Vb in FIG. 4A or 4B.

As shown in FIG. 3, the door beam 8 is made of a pipe having a hollow cross section (closed cross section). The door beam 8 of the present embodiment includes an outside portion 15 forming a hollow flange 17 of the door beam 8 arranged to face the door skin 4 (see FIG. 2), and an inside portion 16 forming a hollow door beam body 18 of the door beam 8. In particular, the door beam 8 has a hat shape in a cross-sectional view intersecting the longitudinal direction. That is, the door beam 8 includes the door beam body 18 corresponding to a crown of the hat shape, and the flange 17 corresponding to a flange of the hat shape. A hollow in the flange 17 is continuous with a hollow in the door beam body 18. A shape of the closed cross section of the door beam 8 as described above is described below in detail, with reference to FIGS. 5A and 5B.

As shown in FIG. 3, the outside portion 15 of the door beam 8 is formed with an outside surface 21 to face the door skin 4 (see FIG. 2). The outside surface 21 corresponds to a "surface configured to face the door skin" in one or more claims as appended or as subsequently amended. In addition, the door beam body 18 forming the inside portion 16 of the door beam 8 has a lateral wall surface 23 defined so as to correspond to a side surface of the crown of the hat shape and has an inside surface 22 defined so as to correspond to a top surface of the crown. Note that the lateral wall surface 23 corresponds to a "wall surface of a door beam body" in one or more claims as appended or as subsequently amended.

As shown in FIG. 4A, the outside surface 21 of the door beam 8 is formed with reinforcing beads 19 and cross beads 20. The reinforcing beads 19 are formed in a center portion in the longitudinal direction of the door beam 8 so as to extend in the longitudinal direction. As shown in FIG. 5A of a cross-sectional view, taken along a line Va-Va in FIG. 4A, the reinforcing beads 19 are each formed with a plate body, defining the outside surface 21 of the door beam 8, partially recessed. This causes the reinforcing beads 19 to partially protrude toward a hollow 25 of the door beam 8 as a ridge line.

In addition, the outside surface 21 of the door beam 8 is formed with grooves 19a extending in the longitudinal direction of the door beam 8 so as to correspond to the reinforcing beads 19. A reference sign V in FIG. 5A represents a contour of the door beam 8 in a cross section taken along a line V-V in FIG. 4A, in a phantom line (chain double-dashed line). Note that the contour V of the door beam 8 has an isosceles trapezoid shape with the outside surface 21 and inside surface 22, which are vertically flat, and a pair of the lateral wall surfaces 23. The flanges 17 are formed at both ends in the up-down direction of the outside surface 21 corresponding to a lower base (long side) of an isosceles trapezoid. Incidentally, the flanges 17 of the present embodiment are each formed to roll back in an arc shape more inward in the vehicle width direction (rightward in FIG. 5A) with an increasing distance vertically from the door beam body 18 having an isosceles trapezoid shape.

As shown in FIG. 5A, a depth of the groove 19a corresponding to the reinforcing bead 19 is indicated by a sign D1 with respect to the contour V of the door beam 8. Incidentally, the reinforcing beads 19 of the present embodiment are assumed to be formed in a double line in a vertical width direction of the door beam 8, but are not limited thereto and may be formed in a single line, or triple or more line. Alternatively, the reinforcing beads 19 may be each formed to have a ridge line which is convex outward in the vehicle width direction (leftward in FIG. 5A).

As shown in FIG. 4A, the cross beads 20 are formed to be perpendicular to the longitudinal direction of the door beam 8. As shown in FIG. 5B of a cross-sectional view, taken along a line Vb-Vb in FIG. 4B, the cross beads 20 are each formed with a plate body, defining the outside surface 21 of the door beam 8, partially recessed at a depth D2 from the contour V of the door beam 8. This causes the cross beads 19 to partially protrude toward the hollow 25 of the door beam 8 as a ridge line. In addition, the outside surface 21 of the door beam 8 is formed with grooves 19b perpendicular to the longitudinal direction of the door beam 8 so as to correspond to the cross beads 20. Incidentally, the hollow in the flange 17 of the present embodiment still has a thickness TH secured to such an extent that it does not become zero due to the grooves 19b, as shown in FIG. 5B.

A plurality of the cross beads 20 as described above are aligned along the longitudinal direction of the door beam 8, as shown in FIG. 4A. However, the cross beads 20 of the present embodiment are formed in the outside surface 21 of the door beam 8, except in the center portion of the door beam 8 where the reinforcing beads 19 are formed. In addition, the cross beads 20 of the present embodiment are desirably formed, except at both ends in the longitudinal direction of the door beam 8, even though not shown. Especially, the cross beads 20 are desirably formed in the general portion 8c of the door beam 8 in FIG. 2.

As shown in FIG. 4B, the lateral wall surface 23 of the door beam 8 is formed therein with a plurality of protruding portions 24 aligned along the longitudinal direction of the door beam 8. As shown in FIG. 5B of a cross-sectional view, taken along the line Vb-Vb in FIG. 4B, the protruding portions 24 are formed to protrude at a protrusion height P from the contour V of the door beam 8.

FIG. 6 is a partially enlarged perspective view of the protruding portions 24 of the door beam 8. As shown in FIG. 6, the protruding portion 24 is substantially at right angle with respect to the outside surface 21, and totally includes three surfaces of a first surface 24a having a planar shape of an isosceles triangle, and a pair of second surfaces 24b, having a planar shape of a trapezoid, rising from a base level 24c of the lateral wall surface 23 defining the contour V (see FIGS. 5A and 5B) and continuing to a pair of equal sides of the first surface 24a. However, the protruding portion 24 may be configured to have four or more surfaces, as long as having at least three surfaces and not interfering with a die 31 (see FIG. 9) at a die cutting time to be described below.

The protruding portions 24 as described above are aligned in a direction perpendicular to the longitudinal direction of the door beam 8 with respect to the cross beads 20. That is, a centerline C in the front-rear direction of the protruding portion 24 in FIG. 4B is aligned in phase with the cross bead 20. Note that the door beam 8 may have the centerline C in the front-rear direction of the protruding portion 24 in FIG. 4B reversed in phase with the cross bead 20 (see FIG. 12).

Next, a description is given of a structure in the door beam 8 of a closed cross section being gradually varied. The door beam 8 of the present embodiment is formed of a pipe compression molded body, as will be described in detail below. That is, a circumferential length of the door beam 8 of the present embodiment, formed of a pipe in a hat shape in cross section, is set to be the same as that of a pipe (steel pipe) as a primary material of the door beam 8.

FIG. 7 is a schematic diagram of the door beam 8 to show a structure of a closed cross section being gradually varied. As shown in FIG. 7, a height in the vehicle width direction (right-left direction in FIG. 7) of the door beam 8 of the present embodiment becomes gradually lower from the center portion toward both ends in the longitudinal direction of the door beam 8. In addition, a vertical width of the door beam 8 becomes gradually wider from the center portion toward both ends in the longitudinal direction of the door beam 8. That is, with reference to arbitrary cross sections Cs1, Cs2, Cs3 aligned in this order from the center portion toward an end in the longitudinal direction of the door beam 8, heights H1, H2, H3 in the cross sections Cs1, Cs2, Cs3 satisfy the relational expression of H1>H2>H3, and vertical widths W1, W2, W3 in the cross sections Cs1, Cs2, Cs3 satisfy the relational expression of W1<W2<W3. Additionally, the door beam 8 of the present embodiment, assuming that a circumferential length thereof is constant from end to end in the longitudinal direction thereof, is formed such that extension lengths (widths) L1, L2, L3 of the flange 17 in the cross sections Cs1, Cs2, Cs3 satisfy the relational expression of L1>L2>L3.

<Manufacturing Method of Door Beam Structure>

Figure 8:
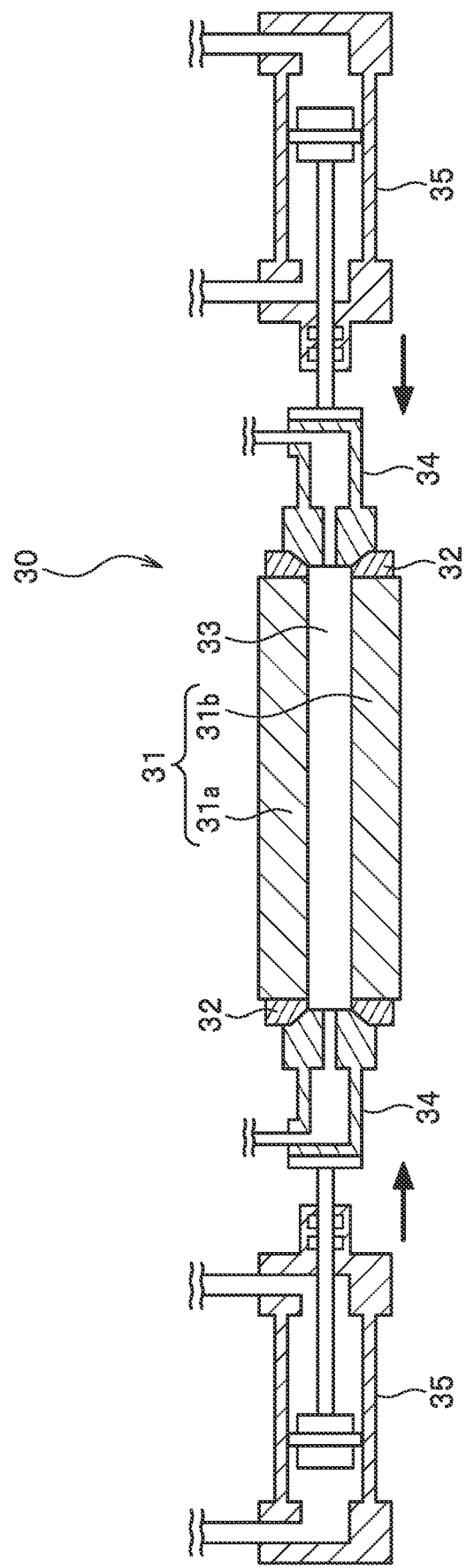
FIG. 8 shows a configuration of a door beam manufacturing device.

Next, a description is given of a manufacturing method of the door beam structure 1 (see FIG. 1). Hereinbelow, a description is first given of a manufacturing device of the door beam 8 (see FIG. 3). FIG. 8 shows a configuration of a door beam manufacturing device 30. As shown in FIG. 8, the door beam manufacturing device 30 mainly includes a blow molding die 31 composed of an upper die 31a and a lower die 31b for interiorly defining a cavity conforming with an outer shape of the door beam 8 (see FIG. 3), an electrode 32 for energizing a pipe 33 (steel pipe as a primary material of a door beam) placed in the blow molding die 31, a gas supply mechanism 34 for supplying gas into the pipe 33, and a press mechanism 35 for pressing the gas supply mechanism 34 against an end in the longitudinal direction of the pipe 33.

According to the door beam manufacturing device 30, the pipe 33 is energized via the electrode 32 and softened through Joule heat generated in the pipe 33. At the same time, high pressure gas is interruptedly blown into the pipe 33 via the gas supply mechanism 34 pressed by the press mechanism 35 against the end in the longitudinal direction of the pipe 33. This causes the pipe 33, placed between the upper die 31*a* and lower die 31*b*, to swell. With the upper die 31*a* and lower die 31*b* closed, the hollow door beam 8 is blow molded in the blow molding die 31. Additionally, the door beam manufacturing device 30 executes die contact cooling for the door beam 8 being obtained, during the upper die 31*a* and lower die 31*b* being closed. This causes a step of blow molding the door beam 8 and a step of quenching the door beam 8 to be executed at the same time or in parallel.

Figure 9:
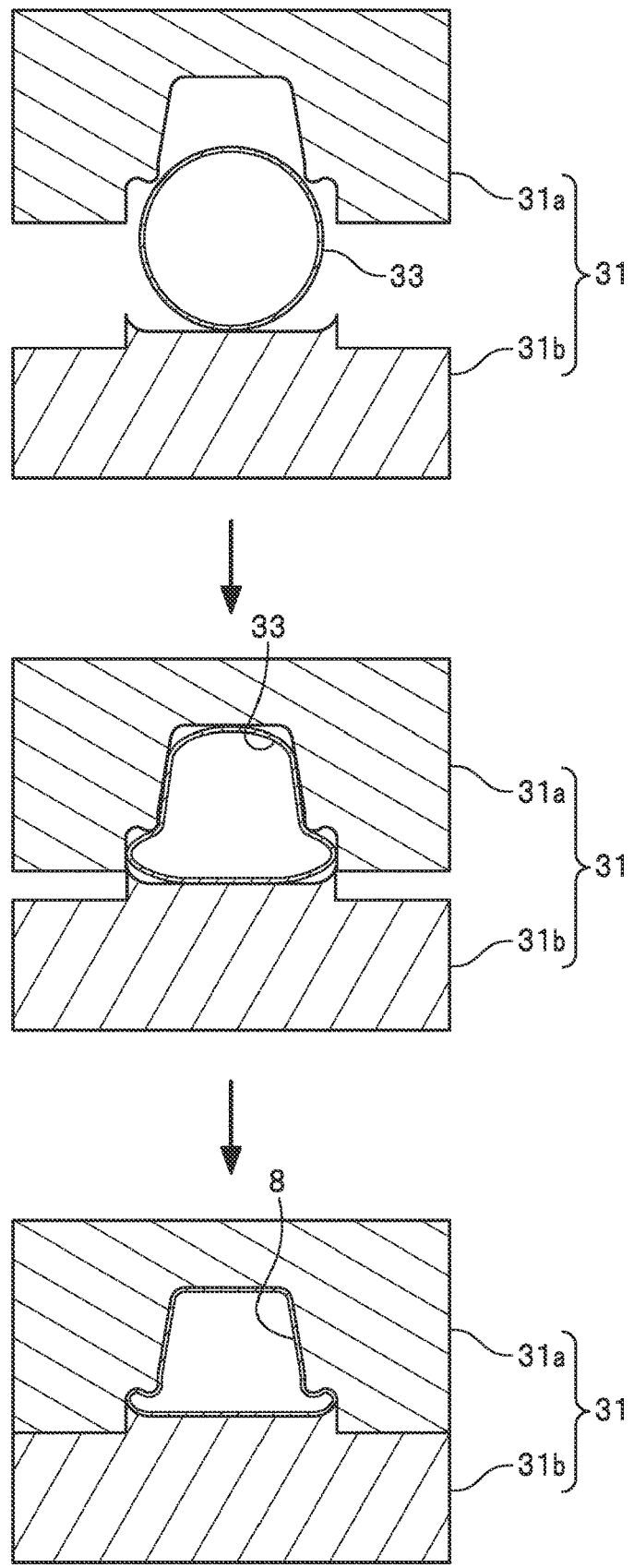
FIG. 9 illustrates a step of blow molding the door beam.

Next, a description is given of a step of molding (blow molding) the door beam 8 (see FIG. 3) using the blow molding die 31 (hereinbelow, simply referred to as the die 31). FIG. 9 illustrates a step of blow molding the door beam 8. As shown in a top diagram in FIG. 9, the pipe 33 is placed between the upper die 31*a* and lower die 31*b* in this molding step. Here, the pipe 33 is a primary material of the door beam 8 (see FIG. 1) and is of a type of steel going through martensitic transformation such as by cooling. Note that the upper die 31*a* of the present embodiment is fashioned after the door beam body 18 (see FIG. 5B) formed with the protruding portion 24 (see FIG. 5B) and an inside half of the flange 17 (see FIG. 5B). Likewise, the lower die 31*b* of the present embodiment is fashioned after an outside half of the flange 17 (see FIG. 5A) formed with the reinforcing beads 19 (see FIG. 5A) and the cross beads 20 (see FIG. 5A).

The pipe 33 is heated next, as described above, and then high pressure gas is supplied into the pipe 33 to cause the pipe 33 to swell. Subsequently, as shown in a center diagram in FIG. 9, the pipe 33 goes through plastic deformation so as to conform with a shape of an inner wall surface (cavity) of the die 31, as the upper die 31*a* and lower die 31*b* being closed.

Then, as shown in a bottom diagram in FIG. 9, the upper die 31*a* and lower die 31*b* are completely closed to form the door beam 8, formed of a pipe having a predetermined thickness and having a hat shape in cross section, in the cavity of the die 31.

Next in the manufacturing method of the door beam structure 1 (see FIG. 1) of the present embodiment, the door beam 8 (see FIG. 9) taken out of the die 31 (see FIG. 9) is processed so as to have predetermined shapes at both ends in the longitudinal direction thereof. In particular, both ends in the longitudinal direction of the door beam 8 are each formed by laser cutting to a shape to be joined to a predetermined portion of the inner panel 3 (see FIG. 2). Then, the front end of the door beam 8 of the present embodiment is joined to the inner panel 3 via the door hinge reinforcing member 12, as shown in FIG. 2. Likewise, the rear end of the door beam 8 is joined to the inner panel 3 via the reinforcing member 14 of the engaging hook 6 (engaging member). The outside surface 21 (see FIG. 2) of the door beam 8 is joined to the inner wall surface of the door skin 4 (see FIG. 2) via a mastic sealer (not shown).

Additionally, the front end of the door beam 8 is fastened to a pivoting end of the door hinge 5, at a threefold portion thereof along with the door hinge reinforcing member 13 and the inner panel 3. Likewise, the rear end of the door beam 8 is fastened by a bolt B or the like, jointly with the engaging hook 6, at a threefold portion thereof along with the reinforcing member 14 of the engaging hook 6 (engaging member) and the inner panel 3. This completes a set of steps of the manufacturing method of the door beam structure 1 according to the present embodiment.

<Advantageous Effects>

Next, a description is given of advantageous effects of the door beam structure 1 and the manufacturing method thereof according to the present embodiment. The door beam structure 1 of the present embodiment is different from a conventional door beam structure (see Patent Document 1, for example) on the point that the door beam 8 has the hollow door beam body 18 in the inside portion 16 and the hollow flange 17 in the outside portion 15 to face the door skin 4. The door beam structure 1 as described above has a superior collision absorption capability in case of a collision and effects reduction in weight of a door beam.

Figure 10:
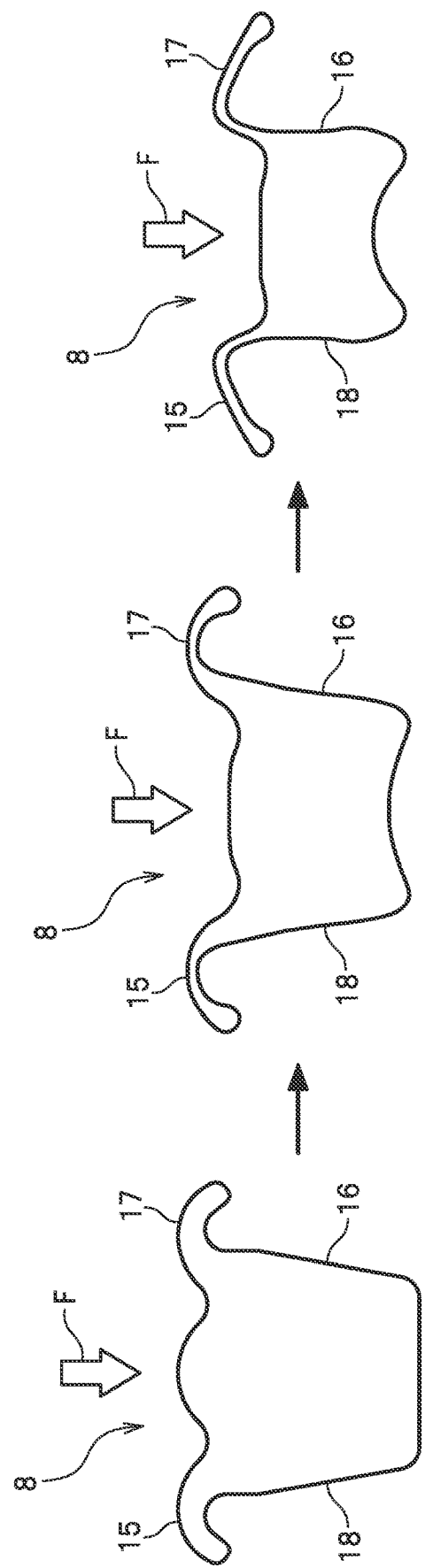
FIG. 10 illustrates a temporal change of a cross section of the door beam when a collision force has been inputted thereto.

FIG. 10 illustrates a temporal change of a cross section of the door beam when a collision force has been inputted thereto. As shown in a left diagram, the door beam 8 has the outside portion 15 of the door beam 8 having the hollow flanges 17 arranged to face the door skin 4. If a force F is inputted to the door beam structure 1 as described above in case of a vehicle collision, the hollow flanges 17 in the outside portion 15 of the door beam 8 are deformed with reaction forces being exerted against the force F, as shown in a center diagram in FIG. 10. This causes the flanges 17 to contribute to absorbing impact energy at an early stage of a lateral collision. Subsequently, the door beam body 18 in the inside portion 16 of the door beam 8 is buckled after the flanges 17 have been crashed, as shown in a right diagram in FIG. 10, to absorb collision energy.

Figure 11:
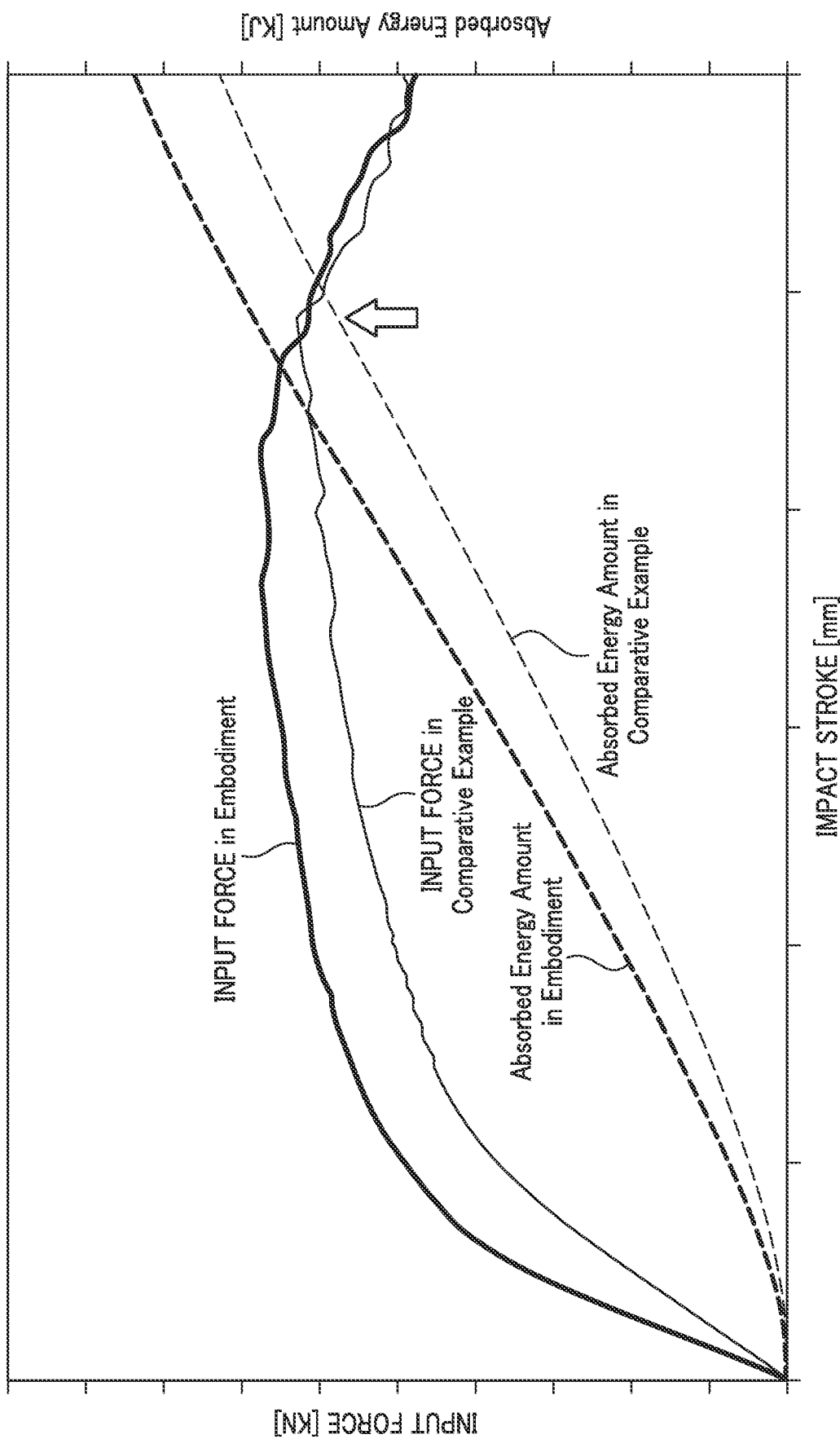
FIG. 11 is a chart to show relationships between impact stroke, input force to the door beam, and absorption energy by the door beam.

FIG. 11 is a chart to show relationships between an impact stroke (in unit of mm), an input force (in unit of kN) to the door beam 8 (see FIG. 8), and absorbed energy amount (EA in short, in unit of kJ) by the door beam 8. The chart in FIG. 11 represents results of tests using the door beam according to the embodiment of the present invention and a door beam according to a comparative example.

The door beam of the embodiment had cross sections shown in FIGS. 5A and 5B, with the maximum vertical width of 69 mm, the maximum lateral width of 44.5 mm, and a wall thickness of 1.6 mm. The door beam of the comparative example was a circular pipe with an outer diameter of 35 mm and a wall thickness of 3.3 mm. Note that the materials and the lengths of the embodiment and the comparative example were the same as each other, except for cross-sectional shapes as described above. Additionally, the door beams of the embodiment and the comparative example had the same weight per unit length as each other.

As shown in FIG. 11, it was verified that the absorbed energy amount is larger with the door beam of the embodiment than that of the comparative example. In addition, it was verified that the initial rise of the reaction force to the inputted impact force is steeper with the door beam of the embodiment than that of the comparative example. Further, the door beam of the comparative example was folded in the middle at a stroke indicated by an open arrow in FIG. 11, while the door beam of the embodiment was not folded.

In addition, the door beam structure 1 of the present embodiment has the reinforcing beads 19 formed in the center portion in the longitudinal direction of the door beam 8. According to the door beam structure 1 as described above, the initial reaction force to a collision force is larger, when the collision force is inputted to the door beam 8, as compared with a door beam having no reinforcing beads 19. The door beam structure 1 as described above also reduces the risk of deformation being converged at the center portion in the longitudinal direction of the door beam 8, to prevent the door beam 8 from being fractured at the center portion.

Further, the door beam structure 1 has a plurality of the cross beads 20 formed in the door beam 8. According to the door beam structure 1 as described above, a plurality of the cross beads 20 arranged along the longitudinal direction of the door beam 8 triggers deformation of the door beam 8 at the outside portion 15 of the door beam 8 due to the input force, to prevent the door beam 8 from being folded in the middle in the longitudinal direction of the inside portion 16. That is, the cross beads 20 control changing a mode of being fractured at the inside portion 16, where the area of a cross section is relatively small, to a mode of being folded at the outside portion 15, where the area of a cross section is relatively large. This increases the amount of impact energy absorbed by the door beam structure 1, in case of a lateral collision.

Still further, the door beam structure 1 has a plurality of the protruding portions 24 formed in the lateral wall surface 23 of the door beam body 18. According to the door beam structure 1 as described above, when the flange 17 has the hollow portion thereof crashed at an early stage of a lateral collision to bottom on the lateral wall surface 23, the lateral wall portion 23 of the inside portion 16 having the protruding portion 24 exerts a large reaction force against the input force.

Still further, the door beam structure 1 has the cross bead 20 and protruding portion 24 aligned to each other in a direction perpendicular to the longitudinal direction of the door beam 8. According to the door beam structure 1 as described above, collision energy is absorbed over a wide range in the longitudinal direction of the door beam 8, effectively from the outside portion 15 inward.

Still further, the door beam structure 1 has the extension lengths (widths) of the flange 17 becoming gradually shorter from the center portion toward both ends in the longitudinal direction of the door beam 8. According to the door beam structure 1 as described above, when the door beam 8 has the circumferential length thereof being constant from end to end in the longitudinal direction thereof, the thickness (height) in the vehicle width direction can be larger toward both ends in proportion to the extension lengths (widths) of the flange 17 becoming shorter. This increases support strength of the door beam structure 1 at both ends in the longitudinal direction of the door beam 8.

Still further, the door beam structure 1 has the front end of the door beam 8 fixed to the door hinge 5 and the rear end of the door beam 8 fixed to the engaging hook 6. According to the door beam structure 1 as described above, support strength is increased at both ends in the longitudinal direction of the door beam 8, to effectively absorb collision energy in case of a lateral collision.

Still further, the door beam structure 1 has the cross beads 20 formed, except at both ends in the longitudinal direction of the door beam 8. According to the door beam structure 1 as described above, having no cross beads 20 at both ends in the longitudinal direction of the door beam 8 allows for increasing the substantial height in the vehicle width direction of the door beam 8, resulting in increasing support strength at both ends in the longitudinal direction of the door beam 8.

Still further, the door beam structure 1 has the mastic sealer interposed between the door beam 8 and the door skin 4. According to the door beam structure 1 as described above, a wide intervening area of the mastic sealer is secured, because the outside portion 15 facing the door skin 4 is wider due to the flange 17 than the inside portion 16. This increases surface stiffness of the door skin 4 and performance of suppressing vibration of the side door 2 in the door beam structure 1. Additionally, a separate bracket for a mastic sealer is no longer required in the door beam structure 1 as described above, because a wide intervening area of the mastic sealer is secured.

Still further, the manufacturing method of the door beam structure 1 according to the present embodiment includes a step of blow molding the door beam 8. According to the manufacturing method as described above, shapes not manufacturable by conventional roll forming, such as the hollow flange 17 and the protruding portion 2 of the door beam body 18, can be obtained. Additionally, the door beam 8 having high strength and a light weight is obtained by the manufacturing method as described above, because the method includes steps of molding and quenching the hollow door beam 8.

Hereinabove, the embodiment of the present invention has been described, but the present invention is not limited thereto and various embodiments are possible. FIG. 12 is a lateral view of a modification of the door beam 8, corresponding to FIG. 4B. As shown in FIG. 12, the door beam 8 according to the modification has the protruding portions 24 alternately aligned in a direction perpendicular to the longitudinal direction of the door beam 8, with respect to the cross beads 20. That is, the centerline C in the front-rear direction of the protruding portion 24 is reversed in phase with the cross beads 20. In other words, the cross beads 20 are formed at an intermediate position between the centerlines C of the adjacent protruding portions 24. According to the door beam structure 1 as described above, the door beam 8 is more reliably prevented from being fractured by impact energy.

LIST OF REFERENCE SIGNS

1: door beam structure, 4: door skin, 5: door hinge, 6: engaging hook, 8: door beam, 15: outside portion, 16: inside portion, 17: flange, 18: door beam body, 19: reinforcing bead, 20: cross bead, 24: protruding portion, 31: die, and 33: pipe (steel pipe).

What is claimed is:

1. A door beam structure for a vehicle side door, comprising:
   a door beam having a hollow cross section,
   wherein the door beam includes:
      an outside portion forming a hollow flange of the door beam arranged to face a door skin, and
      an inside portion forming a hollow door beam body of the door beam, and
   a width of the flange becomes gradually shorter from a center portion in a longitudinal direction of the door beam toward both ends in the longitudinal direction of the door beam.

2. The door beam structure for a vehicle side door according to claim 1, wherein
   a surface of the outside portion configured to face the door skin is formed therein with a plurality of cross beads, each being perpendicular to the longitudinal direction of the door beam, aligned along the longitudinal direction.

3. The door beam structure for a vehicle side door according to claim 2, wherein
   the surface of the outside portion configured to face the door skin is formed therein with one or more reinforcing beads in a center portion in the longitudinal direction of the door beam so as to extend in the longitudinal direction.

4. The door beam structure for a vehicle side door according to claim 2, wherein
   a wall surface of the door beam body, extending in the longitudinal direction and in an inside-outside direction, is formed therein with a plurality of protruding portions, each having at least three surfaces, aligned along the longitudinal direction of the door beam.

5. The door beam structure for a vehicle side door according to claim 4, wherein
the plurality of cross beads are respectively aligned, in a direction perpendicular to the longitudinal direction, to the plurality of protruding portions.

6. The door beam structure for a vehicle side door according to claim 4, wherein
cross beads of the plurality of cross beads are alternately aligned, in a direction perpendicular to the longitudinal direction, to respective protruding portions of the plurality of protruding portions.

7. The door beam structure for a vehicle side door according to claim 1, wherein
a front end of the door beam is fixed to a door hinge of the vehicle side door and a rear end of the door beam is fixed to an engaging hook of the vehicle side door.

8. The door beam structure for a vehicle side door according to claim 2, wherein
the plurality of cross beads are formed, except at both ends in the longitudinal direction of the door beam.

9. A manufacturing method of the door beam structure for a vehicle side door according to claim 1, comprising:
swelling a steel pipe by supplying gas into the steel pipe heated in a die; and
press molding the swelled steel pipe into the door beam, including the outside portion and the inside portion, in the die.

* * * * *